United States Patent [19]
Kyoya

[11] Patent Number: 5,751,878
[45] Date of Patent: May 12, 1998

[54] LIGHT-EMITTING MODULE

[75] Inventor: Shouichi Kyoya, Miyagi-ken, Japan

[73] Assignee: Alps Electric Co., Ltd., Tokyo, Japan

[21] Appl. No.: 795,089

[22] Filed: Feb. 5, 1997

[30] Foreign Application Priority Data

Feb. 8, 1996 [JP] Japan ................................. 8-022696

[51] Int. Cl.$^6$ ................................................ G02B 6/30
[52] U.S. Cl. ........................................ 385/93; 385/34
[58] Field of Search ................................. 385/33, 34, 35, 385/88, 89, 90, 91, 92, 93, 94

[56] References Cited

U.S. PATENT DOCUMENTS

| | | | |
|---|---|---|---|
| 5,307,435 | 4/1994 | Chihara | 385/92 |
| 5,315,609 | 5/1994 | Tanaka et al. | 385/93 |
| 5,353,294 | 10/1994 | Shigeno | 385/93 |
| 5,416,869 | 5/1995 | Yoshimo | 385/88 |
| 5,452,389 | 9/1995 | Tonai et al. | 385/92 |

*Primary Examiner*—John Ngo
*Attorney, Agent, or Firm*—Guy W. Shoup

[57] ABSTRACT

A light-emitting module has a laser diode (LD) held on an LD holder, and a lens contained in a lens barrel held on a lens holder. The LD holder and the lens holder are combined so that the optical axis of a laser beam emitted by the laser diode is aligned with the optical axis of the lens. The lens holder is provided in its outlet portion with an aperture to adjust the fiber-side NA of the lens to 0.08 or below. Thus, the laser beam can be focused on an inlet end surface of an optical fiber in a spot of a relatively great diameter.

4 Claims, 3 Drawing Sheets

LIGHT-EMITTING MODULE

BACKGROUND OF THE INVENTION

1. Field of the Invention

The present invention relates to a light-emitting module for optical communication.

2. Description of the Related Art

A light-emitting module for optical communication comprises, in combination, a laser diode (hereinafter referred to as "LD"), a lens and an optical fiber. A laser beam emitted by the LD is condensed by the lens and optically coupled with the optical fiber by the lens. Light-emitting modules are classified into receptacle type light-emitting modules in which the optical fiber are detachable, and pigtail type light-emitting modules in which the optical fiber is fixed.

In those conventional receptacle type and pigtail type light-emitting modules, the stabilization of the output of the optical fiber, i.e., the efficiency of the optical fiber, is a significant problem. The output (efficiency) of the optical fiber is dependent on the positional deviation of the optical fiber in directions perpendicular to the optical axis of the optical fiber, i.e., the X- and Y-directions, from a correct light coupling position. Generally, the numerical aperture of the fiber-side of the lens, i.e., a side of the lens on the side of the optical fiber, (hereinafter referred to as "fiber-side NA") is about 0.1, and the NA of the LD-side of the lens, i.e., a side of the lens on the side of the LD, (hereinafter referred to as "LD-side NA") is large for a high-efficiency module and is small for a low-efficiency module.

The core, i.e., the light guide portion, of a single-mode optical fiber has a diameter as small as 10 μm, and is eccentric by an eccentricity of about 1 μm with respect to the center of the single-mode optical fiber. Therefore, in the receptacle type light-emitting module in which the optical fiber is detachable, the optical fiber is liable to be dislocated slightly in the X- and Y-directions when detached from or attached to the receptacle, whereby the output of the optical fiber is reduced greatly. In the pigtail type light-emitting module, the output of the optical fiber is reduced if the optical fiber is dislocated from a correct position by the conditions of the environment in which the light-emitting module is used.

SUMMARY OF THE INVENTION

The present invention has been made in view of the problems in the conventional light-emitting modules and it is an object of the present invention to provide a light-emitting module capable of preventing the reduction in output resulting from the positional dislocation of an optical fiber in directions perpendicular to the optical axis of a laser beam.

According to the present invention, the fiber-side NA of a lens is 0.08 or below. Then, a beam is focused on an end surface of the optical fiber in a spot of a greater diameter due to the influence of the diffraction of light, whereby the reduction in output due to the positional dislocation of the optical fiber in directions perpendicular to the optical axis of the laser beam can be prevented.

In one aspect of the present invention, a light-emitting module comprises a laser diode and a lens for condensing light emitted by the laser diode on an optical fiber, in which the fiber-side NA of the lens is 0.08 or below.

To adjust the fiber-side NA of the lens to 0.08 or below, the lens may be locally convex or the surface of the lens may be coated with a screening layer. However, it is most effective in adjusting the fiber-side NA of the lens to 0.08 or below to use an aperture formed in a lens holder holding the lens.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
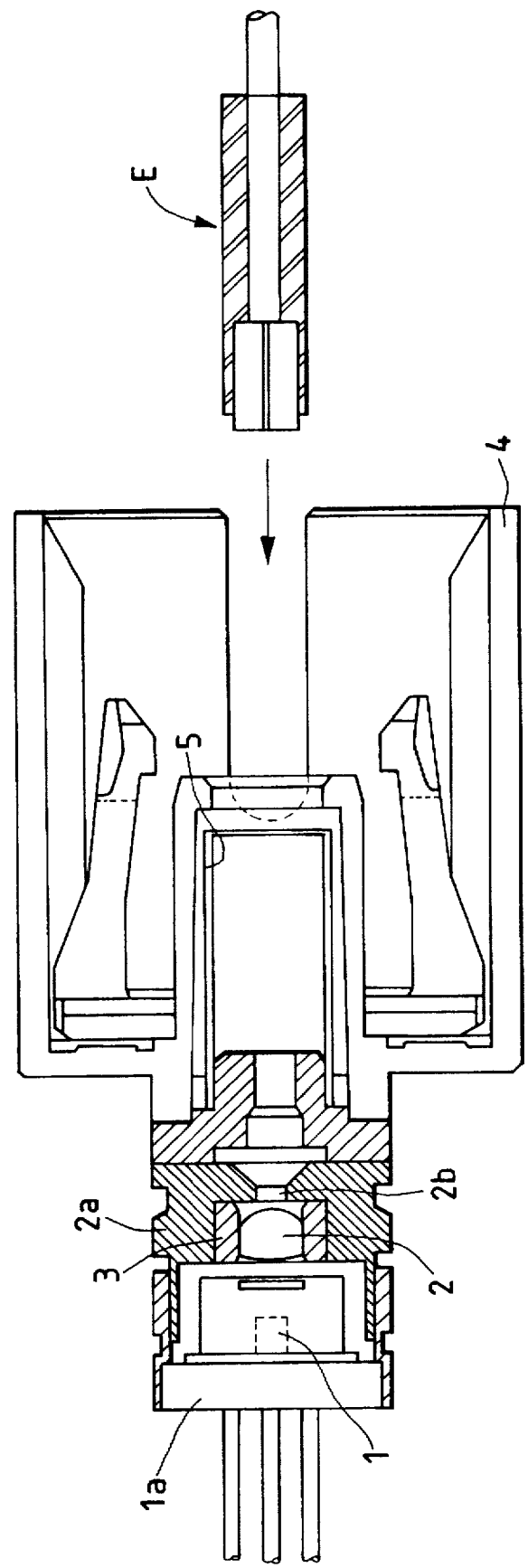
FIG. 1 is a longitudinal sectional view of a light-emitting module in a first embodiment according to the present invention.

Referring to FIG. 1 showing a light-emitting module of a receptacle type in a first embodiment according to the present invention, an LD 1 is supported in an LD holder 1a, and a lens barrel 3 holding a lens 2 is held by a lens holder 2a. An optical fiber F is detachable. The LD holder 1a and the lens holder 2a are fixedly combined so that the respective optical axes of the LD 1 and the lens 2 are aligned with each other. A slotted sleeve 5 to which a connector 4 is attached is fixed to the lens holder 2a. The optical fiber F is inserted in the connector 4. The lens holder 2a is provided with an aperture 2b for adjusting the fiber-side NA, i.e., the NA of a side of the lens 2 on the side of the optical fiber F, to 0.08 or below. Although the aperture 2b is formed in a portion of the lens holder 2a on the side of the outlet end of the lens holder 2a in this embodiment, the aperture for determining the fiber-side NA of the lens 2 may be determined by an aperture formed in a portion of the lens holder 2a on the side of the inlet end of the lens holder 2a, provided that the condition:

$$\text{LD-side NA of the lens 2} = \text{Fiber-side NA} \times \text{Magnification}$$

is satisfied. Alternately, the fiber-side NA of the lens 2 may be determined through a screening layer coated on the surface of the lens 2 or through a convex portion formed on the surface of the lens 2 in its effective diameter portion.

Figure 2:
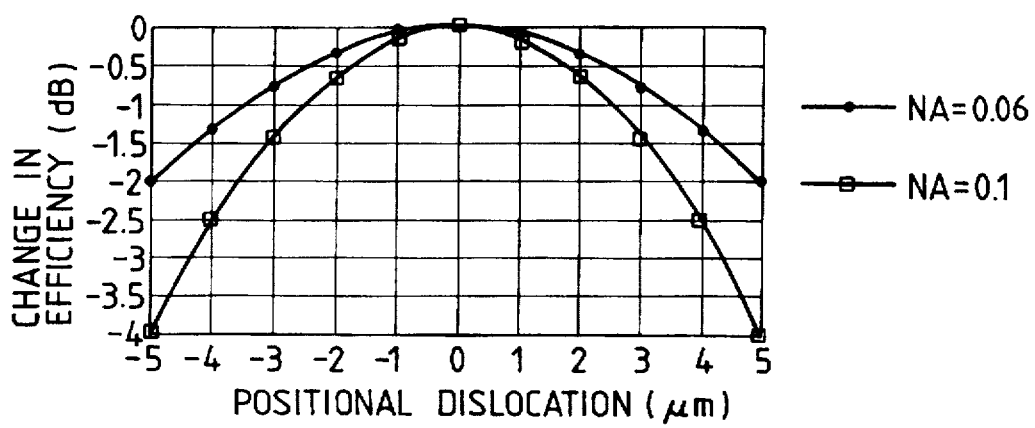
FIG. 2 is a graph comparatively showing the variations of efficiency with positional dislocation of an optical fiber in the light-emitting module of FIG. 1 and a conventional light-emitting module.

As shown in FIG. 2, if the optical fiber F is dislocated in directions perpendicular to the optical axis of a laser beam (X- and Y-directions), the output (efficiency) of the optical fiber F is reduced. Suppose that an allowable output reduction is −0.5 dB, the allowable range of positional dislocation in the X- and Y-directions of the optical fiber F is 0± about 1.8 μm when the fiber-side NA of the lens 2 is about 0.1, which is the fiber-side NA of the lens in the conventional light-emitting module. Since the diameter of the core, i.e., the light guide portion, of a single-mode optical fiber is only about 10 μm and the core is eccentric by an eccentricity of about 1 μm as mentioned above, it is very difficult to limit the positional dislocation of the optical fiber F including the eccentricity of the core thereof to a value in the range of 0± about 1.8 μm. However, the fiber-side NA of the lens 2 in the light-emitting module of the present invention is adjusted to a value not greater than 0.08, for example, to 0.06, by the aperture 2b, and thus the laser beam falls on the end surface of the optical fiber F in a spot of an increased diameter due to diffraction. Therefore, the allowable range of positional dislocation in the X- and Y-directions of the optical fiber F may be expanded to 0± about 2.5 μm, because the allowable range is greatly dependent on the diameter of the spot of the laser beam on the inlet end surface of the optical fiber F. Thus, the allowable range of positional dislocation of the optical fiber in the X- and Y-directions can be expanded if the diameter of the spot of the laser beam on the inlet end surface of the optical fiber F is increased.

Figure 3:
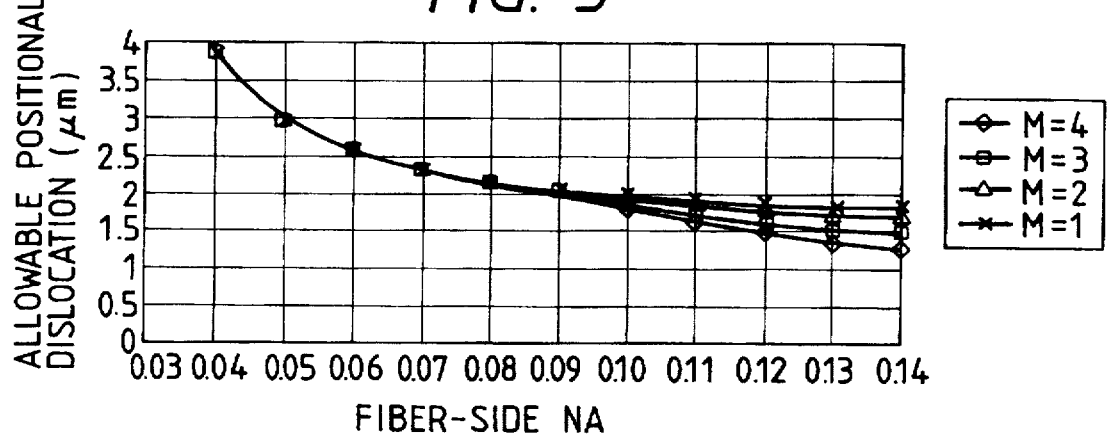
FIG. 3 is a graph showing the dependence of allowable positional dislocation of the optical fiber on the fiber-side NA of a lens.

FIG. 3 is a graph showing the dependence of allowable positional dislocation of the optical fiber on the fiber-side NA of the lens for magnifications M=1, 2, 3 and 4. As shown in FIG. 3, the allowable positional dislocation increases when the fiber-side NA of the lens 2 decreases. If the fiber-side NA of the lens 2 is 0.08 or below, the allowable positional dislocation is not affected by the magnification M. For example, if the fiber-side NA of the lens 2 is 0.07, the allowable range of positional dislocation is 0±2.25 μm. If the positional dislocation is +1.75 μm or −1.75 μm, which is the allowable positional dislocation for the conventional light-emitting module, a change in efficiency is:

$$0.5 \times (1.75/2.25)^2 = 0.3 \text{ dB}.$$

Therefore, the change in efficiency due to the positional dislocation in the X- or Y-direction of the optical fiber F can be reduced by adjusting the fiber-side NA of the lens 2 to 0.08 or below, preferably, to 0.7 or below.

Figure 4:
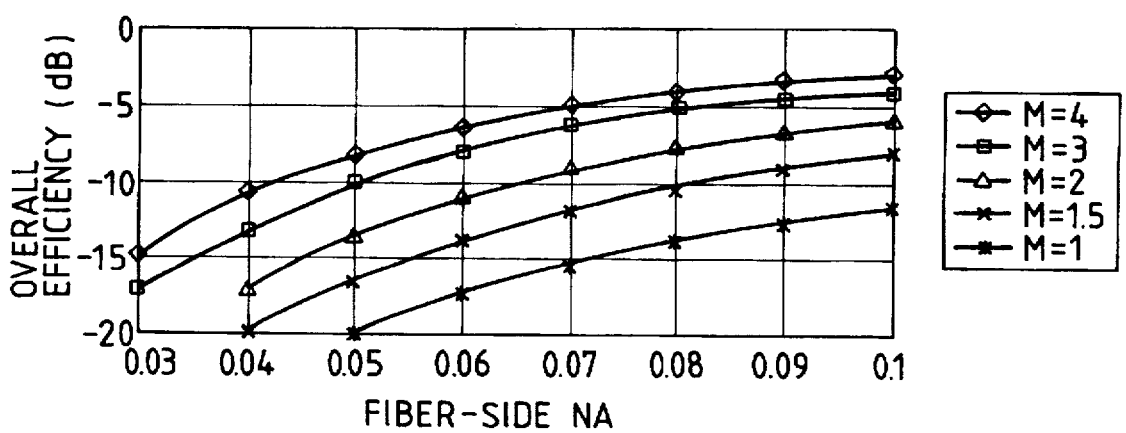
FIG. 4 is a graph showing the relation between overall efficiency and the fiber-side NA of the lens.

FIG. 4 is a graph showing the relation between overall efficiency and the fiber-side NA of the lens 2 for magnifications M=1, 1.5, 2, 3 and 4. If a high output of 2 mW is desired and the output of the LD is 6 mW, $$\text{Efficiency} = 2/6 = 33.3\% = -4.8 \text{ dB}$$

and the light-emitting module is a high-output module of M=4 and fiber-side NA≈0.075.

If a low output of 1 mW is desired and the output of the LD is 6 mW, $$\text{Efficiency} = 1/6 = 16.7\% = -7.8 \text{ dB}$$

and the light-emitting module is a low-output module of M=3 and fiber-side NA 0.06. Therefore, high-output and low-output light-emitting modules can be formed even if the fiber-side NA of the lens is not greater than 0.08.

Figure 5:
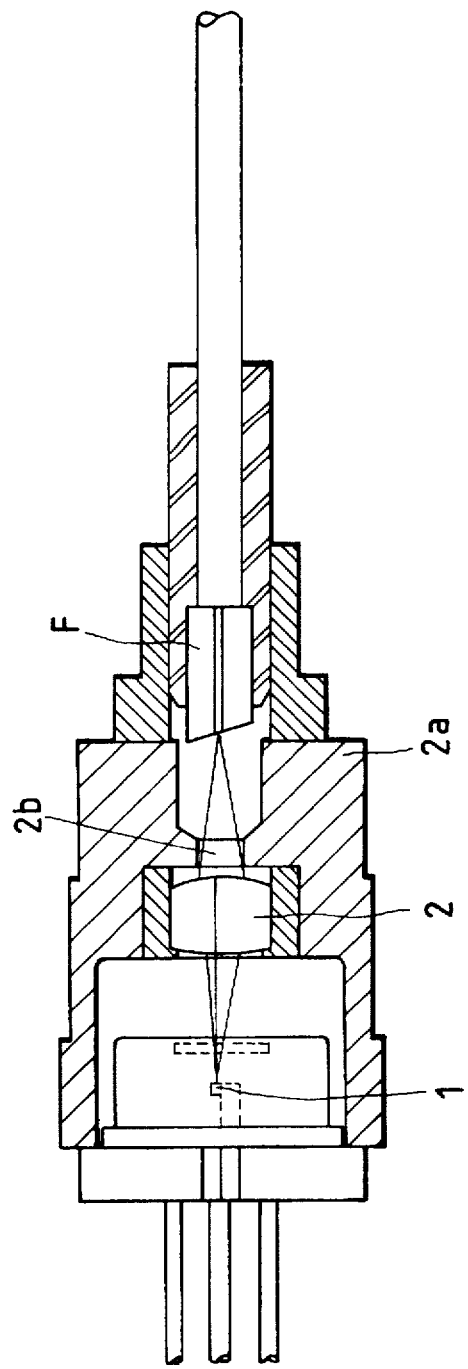
FIG. 5 is a longitudinal sectional view of a light-emitting module in a second embodiment according to the present invention.

FIG. 5 shows a light-emitting module of a pigtail type in a second embodiment according to the present invention. In this light-emitting module, an optical fiber F is fixedly connected to a lens holder 2a by welding using a YAG laser. The light-emitting module shown in FIG. 5 is similar in construction and performance to that shown in FIG. 1 and hence the further description of the same will be omitted.

As is apparent from the foregoing description, according to the present invention, the fiber-side NA of the lens is adjusted to 0.08 or below to focus the laser beam on the inlet end surface of the optical fiber in a spot of a greater diameter. Therefore, the reduction in output due to the positional dislocation of the optical fiber in directions perpendicular to the optical axis of the laser beam can be suppressed.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A light-emitting module comprising: a laser diode; and a lens for gathering light emitted by the laser diode on an optical fiber, wherein the numerical aperture of a side of the lens on the side of the optical fiber is not greater than 0.08.

2. A light-emitting module according to claim 1, wherein the lens is held by a lens holder provided with an aperture for screening part of the light transmitted through the lens toward the optical fiber to adjust the numerical aperture of the side of the lens on the side of the optical fiber to 0.08 or below.

3. A light-emitting module according to claim 1, wherein the light-emitting module is of a receptacle type to which the optical fiber is detachably attached.

4. A light-emitting module according to claim 1, wherein the optical fiber is a single-mode optical fiber.

* * * * *